May 5, 1942. W. HOPPE 2,281,936
LOAF CONTROL FOR BREAD WRAPPING MACHINES
Filed March 11, 1940 4 Sheets-Sheet 1
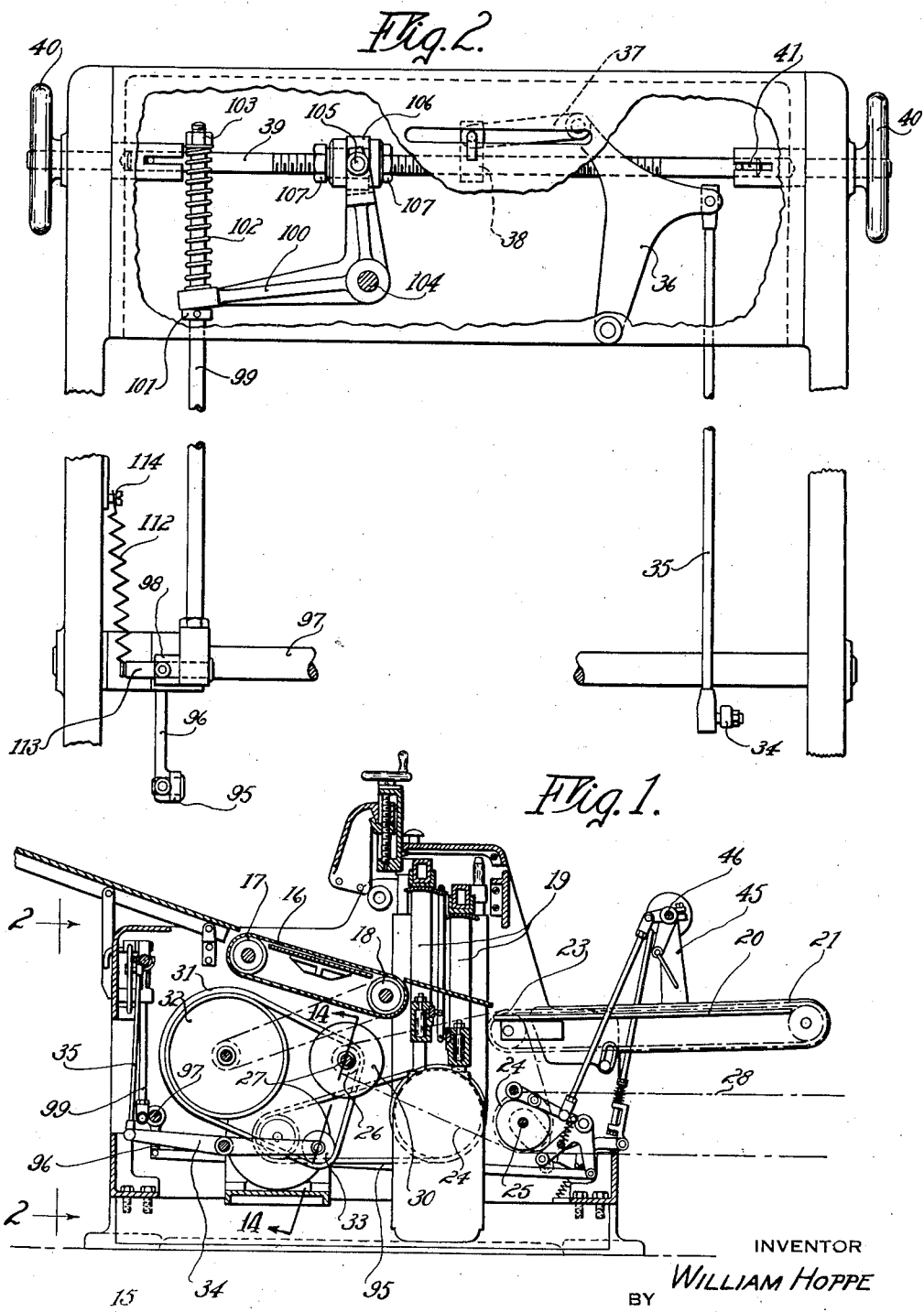
INVENTOR
WILLIAM HOPPE
BY Chapin & Neal
ATTORNEYS May 5, 1942.  W. HOPPE  2,281,936
LOAF CONTROL FOR BREAD WRAPPING MACHINES
Filed March 11, 1940   4 Sheets-Sheet 2
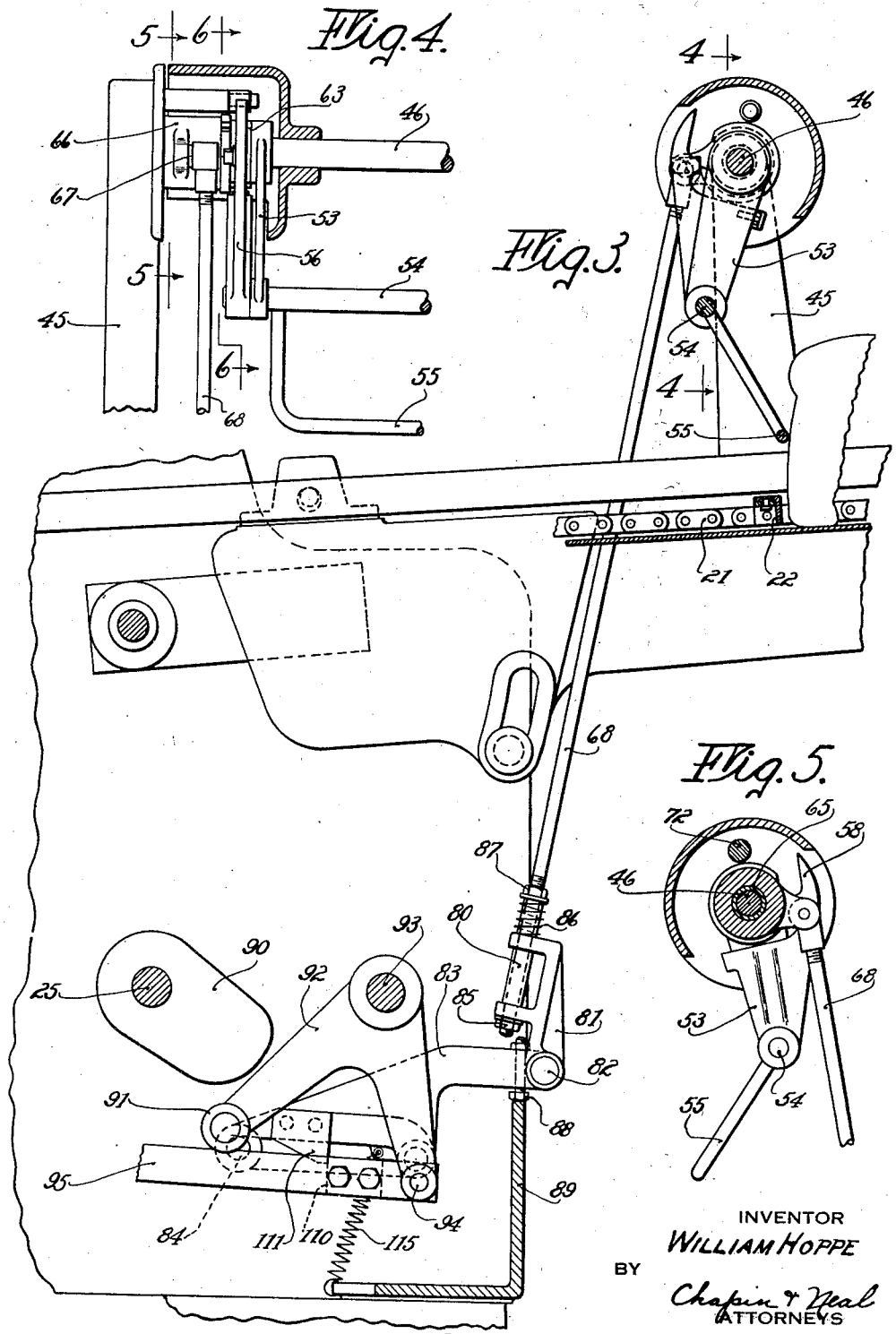
INVENTOR
WILLIAM HOPPE
BY
Chapin & Neal
ATTORNEYS

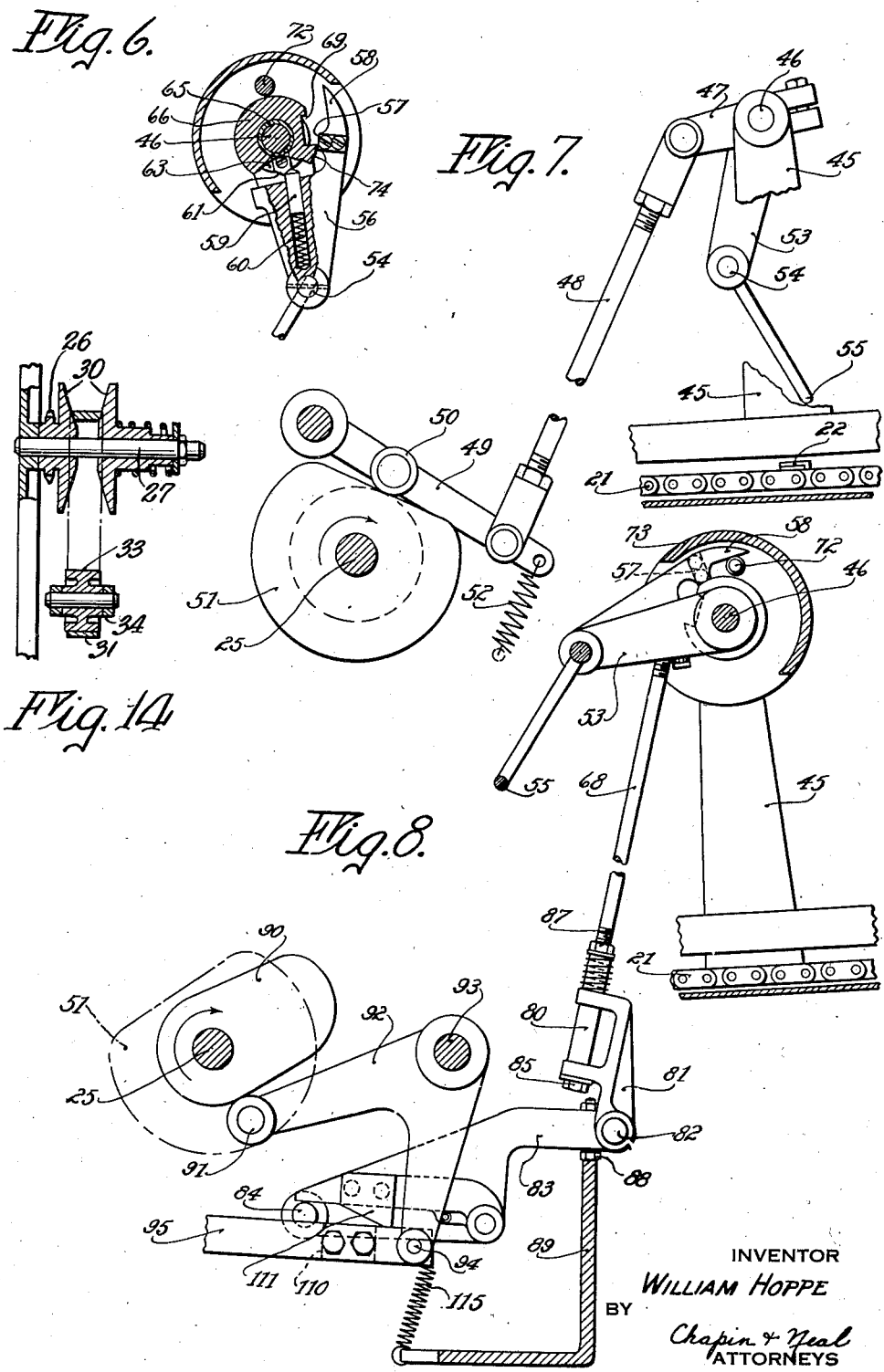

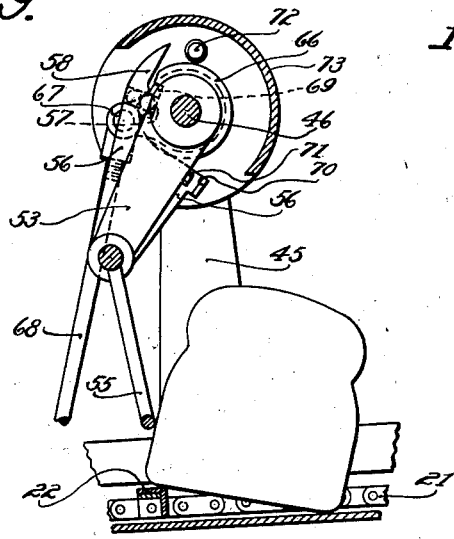
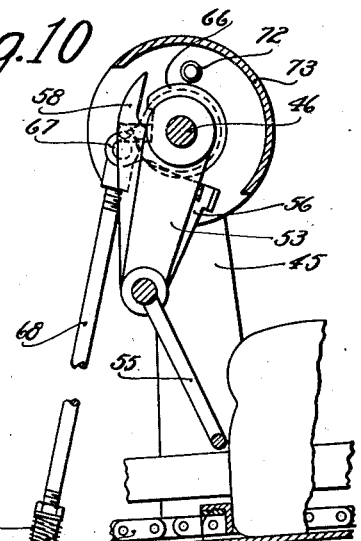
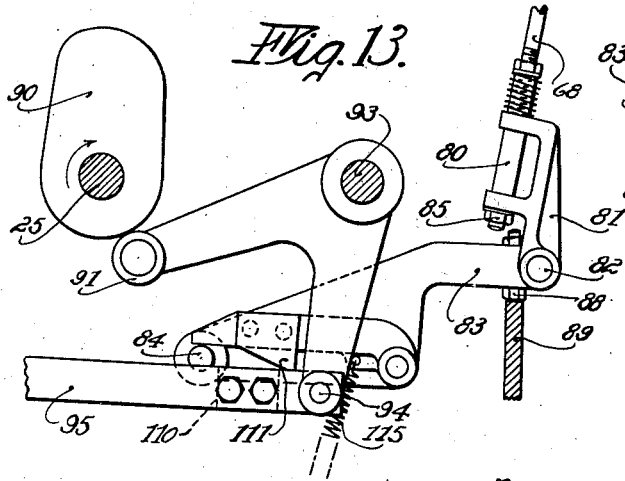
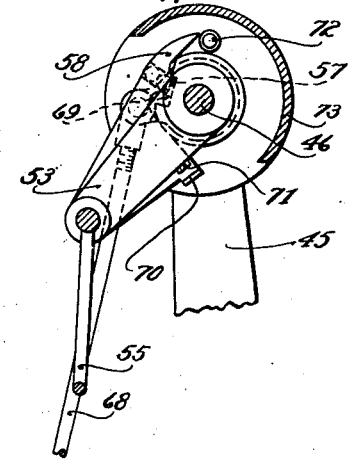
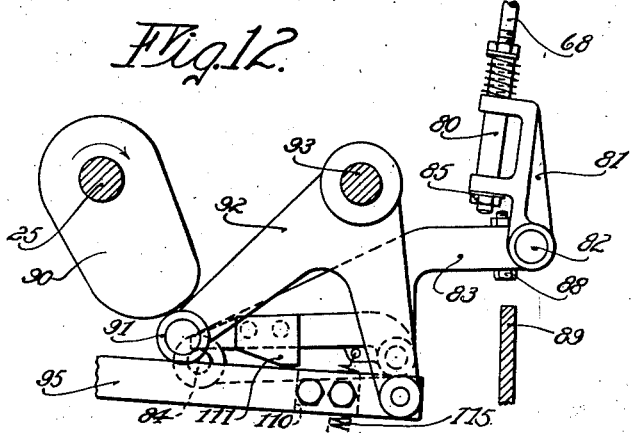

Patented May 5, 1942

2,281,936

UNITED STATES PATENT OFFICE 2,281,936

LOAF CONTROL FOR BREAD WRAPPING MACHINES

William Hoppe, Springfield, Mass., assignor to National Bread Wrapping Machine Co., Springfield, Mass., a corporation of Massachusetts Application March 11, 1940, Serial No. 323,330

10 Claims. (Cl. 146—153)

The present invention relates to a loaf control device for bread slicing machines and is an improvement on the apparatus disclosed in my prior Patents 2,181,680 and 2,181,681, granted November 28, 1939.

One object of the invention is to combine in one mechanism means for correcting the registration of each sliced loaf with the flights of the delivery conveyor and means for correcting the rate of feed of succeeding loaves so that they will arrive in more nearly correct registry with the delivery conveyor. A further object is to improve and simplify the apparatus shown in the prior patents referred to. A further object is to provide a mechanism of this type which will act directly upon the main variable speed drive for the loaf feed. A further object is to avoid the use of electrical detectors and controls. Additional objects will appear from the following description and claims.

Referring to the drawings:

Fig. 1 is a sectional elevation of a bread slicing machine corresponding to my invention, corresponding generally to Fig. 1 of my prior Patent 2,181,681;

Fig. 2 is a view thereof taken on line 2—2 of Fig. 1, with portions of the frame broken away;

Fig. 3 is an enlarged detail of a portion of the delivery conveyor and the loaf aligning mechanism;

Fig. 4 is a section on line 4—4 of Fig. 3;

Fig. 5 is a section on line 5—5 of Fig. 4;

Fig. 6 is a section on line 6—6 of Fig. 4;

Fig. 7 is a detail illustrating the manner in which the loaf aligning device is driven;

Fig. 8 is a detail showing the aligning device in its rearmost position and illustrating the resetting of the mechanism which controls the speed of the loaf feeding device;

Fig. 9 is a similar view showing the initial contact between the loaf aligning device and a mispositioned loaf;

Fig. 10 is a similar view showing the loaf shifted into alignment with the delivery conveyor;

Fig. 11 is a similar view showing the start of the resetting operation;

Fig. 12 is a detail of the latching means controlling the loaf feeding device at the start of a corrective movement;

Fig. 13 is a similar view during the corrective movement; and

Fig. 14 is a section on line 14—14 of Fig. 1.

Referring first to Fig. 1, the slicing machine is supported upon a frame 15 in which a loaf feed belt 16 is mounted on pulleys 17 and 18. This feed belt carries the loaves between knives 19 onto a delivery table 20, which may be set at any desired angle in order to carry the sliced loaves to the feeding conveyor of a wrapping machine. The sliced loaves received upon the delivery table are carried along it by a continuously moving conveyor 21 having spaced flights 22 (Fig. 3). The delivery conveyor 21 is driven in timed relation with the wrapping machine to which it delivers the sliced loaves; for this purpose the driving sprocket 23 of the delivery conveyor being coupled by a chain connection with a sprocket 24 on a shaft 25 and a sprocket 26 on a shaft 27. Shaft 25 is driven by a chain connection 28 from the wrapping machine.

The shaft 27 carries a pair of spaced spring pressed cone pulleys 30 shown in further detail in my prior Patent 2,181,681. A belt 31 passes around the cone pulleys, around a pulley 32 on a stationary axis and around a pulley 33 mounted on a rocker 34. The pulley 32 is chain connected with the driving sprocket 18 of the feed belt. A rod 35 connects the rocker 34 with a rocker 36 (Fig. 2) pivoted in the frame and having a link connection 37 with a sliding nut 38 through which an adjusting shaft 39 is threaded. Adjustment of the position of pulley 33 and therefore the spacing of the axially separated cone pulleys 30 is under the control of hand wheels 40, having a pin and slot connection 41 with the shaft 39 in order to permit bodily movement of the shaft by mechanism which will be described below. The mechanism thus far described, with the exception of the bodily movement given to the adjusting shaft, is the same as that in my Patent 2,181,681 and for a complete description thereof reference is made to that patent.

In brackets 45, arising on each side of the delivery conveyor, is journaled a cross shaft 46 which is oscillated periodically by mechanism similar to that described in my prior patent. Briefly, this mechanism comprises an arm 47 (Fig. 7) carried by the shaft 46 and connected by a link 48 with an oscillating lever 49 bearing a cam roll 50 engaging a cam 51 on the constantly rotating shaft 25. The cam roll is held against the cam by a spring 52. The arrangement of the parts is such that the active loaf positioning stroke of the aligning device is under the influence of the spring 52, the inactive stroke only being positively caused by the cam.

Rigidly secured to the shaft 46 are spaced arms 53 (Figs. 3 and 4) carrying between them a shaft 54 to which a loaf positioning bail 55 is secured. The shaft 54 is free to turn in the arms 53 and carries at one end a latch 56 having a contact piece 57 (Fig. 6) and a resetting tail 58. The latch carries a plunger 59 pressed by a spring 60 toward the axis of the shaft 46 and tapered on its end so as to contact a positioning member 61 carried by a collar 63 secured to the shaft 46 and oscillating therewith.

Surrounding the shaft 46 is a sleeve 65 secured to one of the brackets 45. Around this sleeve is rotatable a hub 66 having a pivoted connection 67 (Fig. 4) with a rod 68 which serves, as will be described below, to control the actuation of the speed change mechanism for the loaf feed. As is best seen in Fig. 6, the hub member 66 has a notch 69. This notch, or the portions of the hub 66 on either side of it, form a limit in one direction for the oscillation for the latch 56 about the pivoted shaft 54. A stop in the other direction is provided by a lug 70 (Fig. 11) on the latch coacting with a stop 71 on the arm 53.

Bearing in mind that the rod 68 acts to set the loaf feed speed varying device for actuation by other means, and neglecting for the moment the mechanism by which this is accomplished, the operation of the mechanism so far described will now be considered. As is described in my prior patents, a continuous series of loaves is forced through the knives by the feeding conveyor, which may have associated with it an upper belt conveyor if desired. The direction of feed of the loaves is preferably at an angle to the plane of the knives and the delivery conveyor also makes an angle with respect to the line of feed. In theory the speed of the loaves as they are fed through the knives is such that one of the pushers 22 will ride up over the end of the delivery plate 20 directly to the rear of each sliced loaf as it is set down upon the plate. Due to variations in the size of the loaves it is impossible to keep this registration exact and the speed of the feed is therefore chosen so that any tendency towards misregistration of the loaves will be in a direction to cause lagging of a loaf relative to the delivery conveyor. Since the direction of feed is at an angle to the delivery conveyor, this will cause the mispositioned loaf to ride on one of the flights as shown in Fig. 9.

As has been stated above, the arm 53 carrying the bail 55 is given a periodic oscillation. At the rear of this stroke the bail will be at an elevation above the oncoming sliced loaves. It then swings forwardly, engaging a mispositioned loaf as in Fig. 9 and moving it ahead of the flight 22 as in Fig. 10. This motion of the bail occurs whether or not a loaf is mispositioned. If the loaf is received in front of the conveyor flight the detent 59 will maintain the bail in its initial position shown in Figs. 3 and 6 in which the latch 56 is held with its lug 70 in contact with the stop 71. If a mispositioned loaf is encountered, a resistance to the movement of a bail is set up which will cause the latch to be rotated about the pivot 54 and the contact piece 57 to be swung into the notch 69. When the latch has been moved to this position it will be held there until reset. The latch and the bail then continue to move as an integral part of the arms 53 and, since the contact piece 57 is in the notch, rotation of the hub 66 and downward movement of the rod 68 will result.

At the end of the forward movement of the bail, the loaf will have been positioned forwardly of the conveyor flight 22. As the arms and bail are swung rearwardly the resetting tail 58 of the latch (Fig. 8) will ride up on a resetting pin 72 secured to a cover member 73 carried by the bracket 45. The resetting pin causes the latch to swing outwardly, snapping the detent 59 to the other side of piece 61 and placing the bail again in position for its forward stroke.

It should be observed that the forward movement of the bail must of necessity be at a higher rate than the travel of the delivery conveyor, and that for this reason a slight contact with a loaf in correct registration may result. This will, however, not occur until a point toward the forward end of the stroke of the bail. It is undesirable to have this contact with a normally positioned loaf cause actuation of the rod 68 and for this reason the hub 66 has its notched surface bordered by a cylindrical portion 74 (Fig. 6). If contact of the bail with the loaf does not occur during the time in which the contact piece 57 is in registration with the notch 69, swinging movement of the hub cannot occur; the contact piece merely sliding over the cylindrical portion 74.

The rod 68 extends downwardly through a sleeve 80 (Fig. 3) carried by an arm 81 pivoted at 82 to a member 83 swinging about a pivot 84 on the frame. The rod has a nut or other stop means 85 on its lower end and has a spring 86 above the arm 81 held in place by a nut 87. The member 83 carries an adjustable stop nut 88 adapted to strike a bracket 89 on the frame to determine the lower position of the member. When the rod descends, as in Fig. 10, it lowers the member 83 until the stop 88 contacts with the bracket and then slides through the arm 81, compressing the spring 86.

The shaft 25 carries a cam 90 (Fig. 3) adapted to contact a cam roll 91 on one arm of a bell crank lever 92 pivoted to the frame at 93, the other arm of the bell crank being pivoted at 94 to a bar 95 extending longitudinally of the machine. At the rear of the machine (Figs. 1 and 2) the bar 95 is pivoted to an arm 96 secured to a shaft 97. A second arm 98 on this shaft is connected to a link 99 extending freely through a hole in one arm of a bell crank 100. The rod 99 has a collar 101 adapted to contact the lower surface of the bell crank arm and has a spring 102, held in place by a nut 103, which exerts a yielding force on the upper side of the arm. The bell crank is pivoted at 104 to the frame and has an end 105 pivoted to a collar 106 held by collars 107 secured to the shaft 39. If the rod 99 is moved upwardly the adjusting shaft 39 will be moved to the right, and the pulley 33 moved by the linkage described above a sufficient amount to cause a slight accelerated movement of the belt 16 as long as the rod 99 is held elevated.

The bar 95 carries a block 110 (Fig. 3) with which a wedge-shaped latch 111 on the member 83 is adapted to contact. When the member 83 is in the position of Fig. 3 the latch 111 is in engagement with the block 110 and the bell crank 92 will be held by it so that the roll 91 will be unable to follow the cam 90. It is otherwise caused to follow the cam by a spring 112 (Fig. 2) mounted between a lug 113 on the arm 98 and a pin 114 on the frame. As long as the contact piece 57 (Fig. 6) is not permitted to fall into the notch 69, the latch 111 (Fig. 3) will remain in engagement with the block 110. If a loaf is riding on a conveyor flight, as in Fig. 9, and the contact piece is thus tripped into the notch, the rod 68 will be pushed downwardly during the remaining portion of the forward stroke of the bail 55, this action being without function as the rod slides freely through the arm 81. As the arm 53 and the bail swing rearwardly, however, the rod will be brought back into position to have the nut 85 contact the arm 81, thus raising the member 83 as in Fig. 12 and lifting the latch 111 out of contact with the block 110. The roll 91 is thus permitted to follow the cam 90, moving the bar 95 to the left, and in the manner described above a slight acceleration will be given to the loaf feed. As the cam swings beyond the position shown in Fig. 13, the bell crank 92 will be again swung back toward the position of Fig. 12, but in this instance the rod 68 has been freed by mechanism to be described and the latch 111 will be drawn downwardly by a spring 115 so that it will once more engage the block 110.

The mechanism for freeing the latch is best shown in Fig. 8. In this figure the arm 53 is shown at the upper extreme point of its travel, and it will be seen that the resetting tail 58 has come in contact with the pin 72 camming the contact piece 57 out of the notch 69. This frees the rod 68 so that the spring 115 is free to draw the member 83 downwardly.

By the mechanism described, the bail 55 will be oscillated once for every cycle of the machine. If the loaf in front of it is in registration, contact will not be made sufficiently early to permit the contact piece 57 to enter into the notch 69 and, therefore, the latch 111 will not release the bar 95. No correction can therefore occur. If, however, a loaf is mispositioned, as in Fig. 9, the contact piece will be shifted into the notch and on the next rearward stroke of the bail the loaves being fed into the machine will be given an acceleration lasting only a portion of the cycle of the machine. The feeding conveyor thus has a constant forward movement which will be accelerated a definite amount and for a definite period each time a load is mispositioned. This periodic acceleration will be repeated until the loaves are brought back into registration so that no advancing action of the bail will be necessary to reposition a loaf. In order to avoid getting the loaves ahead of their flights, however, for which no correcting mechanism is provided, the adjusting hand wheels 40 are so set that there will always be a slight tendency to under-feed. Unless this tendency is too great, a correcting action will occur periodically only after the passage of several loaves.

What I claim is:

1. In a bread slicing machine, slicing knives, means for feeding loaves to the knives, means for removing sliced loaves from the knives at periodic intervals, a pusher movable to contact the rear of a mispositioned sliced loaf to forward it sufficiently to correct its misregistration, and mechanism controlled by contact of the pusher with the mispositioned loaf to impart to the loaf feeding means a temporary speed in excess of its normal speed.

2. In a bread slicing machine, slicing knives, a continuously operating loaf feeding conveyor positioned to feed an abutting series of loaves to and through the knives, a delivery conveyor at an angle to the feeding conveyor and positioned to receive sliced loaves from the knives, a pusher movable to contact the rear of a mispositioned sliced loaf to forward it sufficiently to correct its misregistration, and mechanism controlled by contact of the pusher with the mispositioned loaf to impart to the loaf feeding means a temporary speed in excess of its normal speed.

3. In a bread slicing machine, slicing knives, a continuously operating loaf feeding conveyor positioned to feed an abutting series of loaves to and through the knives, a delivery conveyor at an angle to the feeding conveyor and positioned to receive sliced loaves from the knives, a pusher movable to contact the rear of a mispositioned sliced loaf to forward it sufficiently to correct its misregistration, a drive for the feeding conveyor including a belt and a driven member comprising opposed cone pulleys, and mechanism controlled by contact of the pusher with the mispositioned loaf to cause approach of the pulleys to increase their effective diameter.

4. In a bread slicing machine, slicing knives, a continuously operating loaf feeding conveyor positioned to feed an abutting series of loaves to and through the knives, a delivery conveyor at an angle to the feeding conveyor and positioned to receive sliced loaves from the knives, a pusher movable to contact the rear of a mispositioned sliced loaf to forward it sufficiently to correct its misregistration, a drive for the feeding conveyor including a driven member comprising yieldably mounted opposed cone pulleys, a movable pulley, and a belt passing around said pulleys, and mechanism controlled by contact of the pusher with the mispositioned loaf to shift the movable pulley in a direction to relieve the tension on the belt.

5. In a bread slicing machine, slicing knives, a continuously operating loaf feeding conveyor positioned to feed an abutting series of loaves to and through the knives, a delivery conveyor at an angle to the feeding conveyor and positioned to receive sliced loaves from the knives, a pusher movable to contact the rear of a mispositioned sliced loaf to forward it sufficiently to correct its misregistration, a drive for the feeding conveyor including a driven member comprising yieldably mounted opposed cone pulleys, a movable pulley, and a belt passing around said pulleys, power mechanism for shifting the movable pulley temporarily in a direction to relieve the tension on the belt, and mechanism controlled by contact of the pusher with the mispositioned loaf to activate said power mechanism for a predetermined length of time.

6. In a bread slicing machine having slicing knives, a loaf feeding conveyor, a delivery conveyor having flights, a pusher, and means for moving the pusher in timed relation to the flights to move a mispositioned loaf ahead of its flight; means for varying the speed of the loaf feeding conveyor, and connections between the pusher and the speed varying means including a latch engageable by contact of the pusher and the loaf.

7. In a bread slicing machine having slicing knives, a loaf feeding conveyor, a delivery conveyor having flights, a pusher, and means for moving the pusher in timed relation to the flights to move a mispositioned loaf ahead of its flight; means for varying the speed of the loaf feeding conveyor, connections between the pusher and the speed varying means including a latch engageable by contact of the pusher and the loaf, means including a cam for actuating the speed varying means periodically when not restrained, a second latch normally holding said actuating means out of action, and connections between the first latch and the second latch to release the latter after the first latch has been engaged.

8. In a bread slicing machine having slicing knives, a continuously operating loaf feeding conveyor, a delivery conveyor having flights, and a loaf forwarding pusher mounted in adjacency to the delivery conveyor; means for varying the speed of the loaf feeding conveyor, spring actuated means operable to cause operation of said speed varying means, cam means to restore the spring actuated means periodically to inactive position, a latch operable to hold said spring actuated means in inactive position, and means operable by contact of the pusher with a loaf for releasing the latch.

9. In a bread slicing machine having slicing knives, a continuously operating loaf feeding conveyor, a delivery conveyor having flights, and a loaf forwarding pusher mounted in adjacency to the delivery conveyor; means for varying the speed of the loaf feeding conveyor, spring actuated means operable to cause operation of said speed varying means, cam means to restore the spring actuated means periodically to inactive position, a latch operable to hold said spring actuated means in inactive position, mechanism for moving the pusher periodically to forward a loaf ahead of its flight, and a latch operable by contact of the pusher with a loaf and operable to connect the first-named latch with the pusher moving means whereby the first-named latch will be drawn to released position.

10. In a bread slicing machine having slicing knives, a conveyor engaging frictionally an unbroken succession of loaves to feed them to and through the knives, and a pusher conveyor receiving the sliced loaves from the knives; adjustable driving means for the frictional conveyor, power mechanism normally disconnected from the adjustable driving means and operable when so connected to impart temporary increased speed to the frictional conveyor, a pusher movable to contact the rear of a mispositioned loaf on the pusher conveyor and to forward it sufficiently to correct its misregistration, and mechanism controlled by contact of the pusher with the rear of a loaf to connect said power mechanism with the adjustable driving means.

WILLIAM HOPPE.

CERTIFICATE OF CORRECTION.

Patent No. 2,281,936.  May 5, 1942.

WILLIAM HOPPE.

It is hereby certified that error appears in the printed specification of the above numbered patent requiring correction as follows: Page 3, first column, line 58, before "means", first occurrence, insert --continuously operating--; and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents.